United States Patent [19]

Orikasa

[11] Patent Number: 5,384,827
[45] Date of Patent: Jan. 24, 1995

[54] CORDLESS TELEPHONE SYSTEM CAPABLE OF QUICKLY ESTABLISHING CONNECTION DURING CALL SETUP PHASE

[75] Inventor: Hiromi Orikasa, Tokyo, Japan
[73] Assignee: NEC Corporation, Tokyo, Japan
[21] Appl. No.: 690,417
[22] Filed: Apr. 24, 1991

[30] Foreign Application Priority Data

Apr. 24, 1990 [JP] Japan ................................. 2-108351

[51] Int. Cl.[6] .......................................... H04M 11/00
[52] U.S. Cl. .......................................... 379/61; 379/63
[58] Field of Search ........................ 379/58, 59, 60, 61, 379/62, 63; 455/34.1, 34.2

[56] References Cited

U.S. PATENT DOCUMENTS

| | | | |
|---|---|---|---|
| 4,656,653 | 4/1987 | Oda et al. | 379/58 |
| 4,672,657 | 6/1987 | Dershowitz | 379/63 |
| 4,768,220 | 8/1988 | Yoshihara et al. | 379/58 |
| 4,894,856 | 1/1990 | Nakamishi et al. | 379/58 |
| 4,939,785 | 7/1990 | Murata et al. | 379/61 |

FOREIGN PATENT DOCUMENTS

| | | |
|---|---|---|
| 5685786 | 4/1986 | Australia . |
| 0189920 | 8/1986 | European Pat. Off. ............. 379/60 |
| 0213929 | 3/1987 | European Pat. Off. . |
| 1-208919 | 8/1989 | Japan . |

*Primary Examiner*—Curtis Kuntz
*Assistant Examiner*—G. J. Oehling
*Attorney, Agent, or Firm*—Sughrue, Mion, Zinn, Macpeak & Seas

[57] ABSTRACT

In a cordless telephone system, several speech channels are periodically scanned by a base station during a standby mode to detect idle channels from the scanned channels. In response to receipt of a call request from a cordless station or an incoming call from a switched telephone network, the base station transmits a channel indicating signal to the cordless station over a control channel indicating that the detected idle channels can be used as possible candidate channels, switches to a first candidate channel and waits for an end-of-switching signal from the cordless station until a prescribed period of time expires. On receiving the channel indicating signal, the cordless station switches to the first candidate channel and makes a channel check on it and transmits an end-of-switching signal if it determines that the first candidate channel is idle. If the end-of-switching signal is not received from the cordless station before the prescribed period expires, the base station switches to a second candidate channel. If the cordless station determines that the first candidate channel is busy, it switches to the second candidate channel and makes a channel check on it. If the cordless station determines that the second candidate channel is idle, it transmits the end-of-switching signal over the second candidate channel.

8 Claims, 7 Drawing Sheets

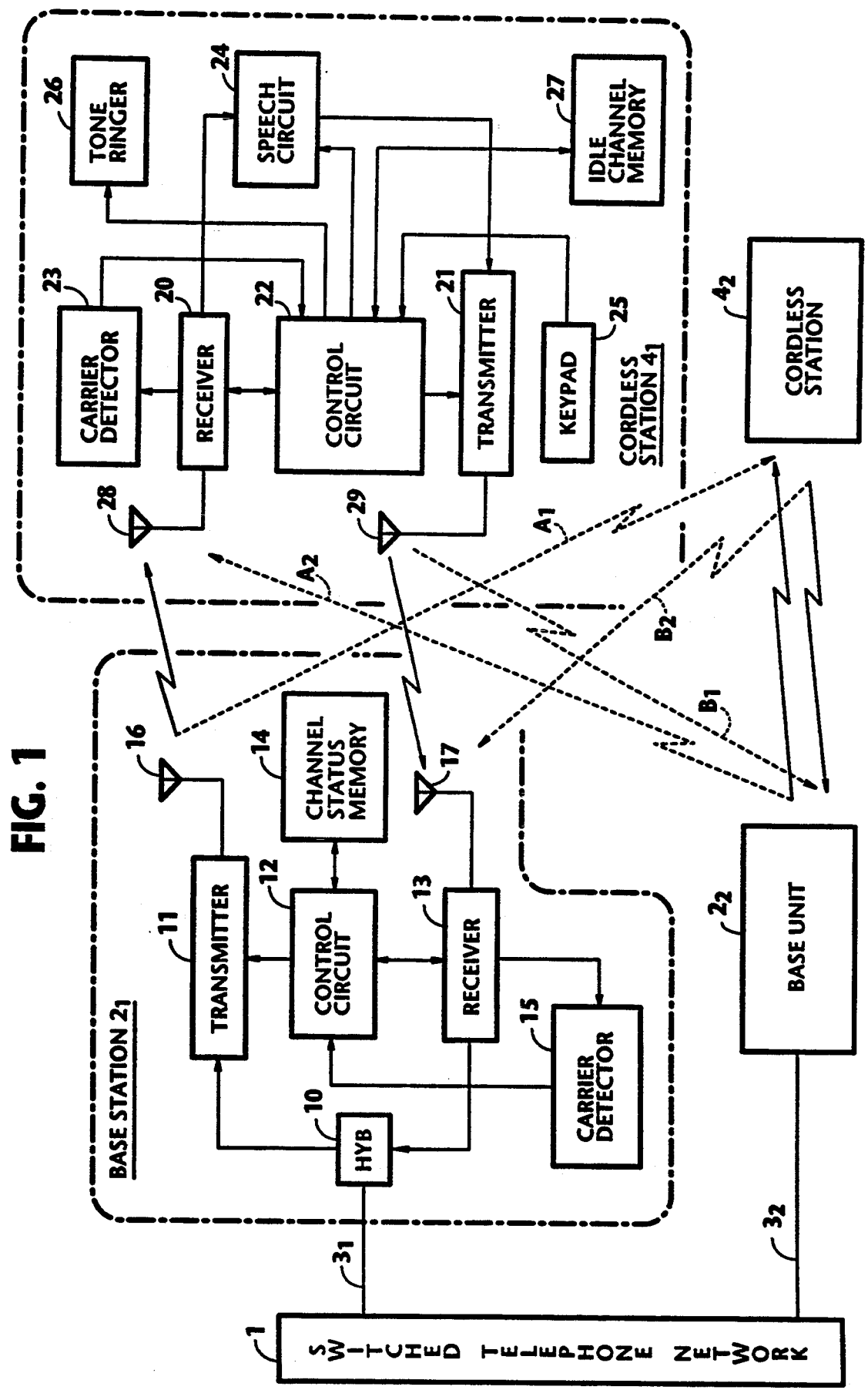

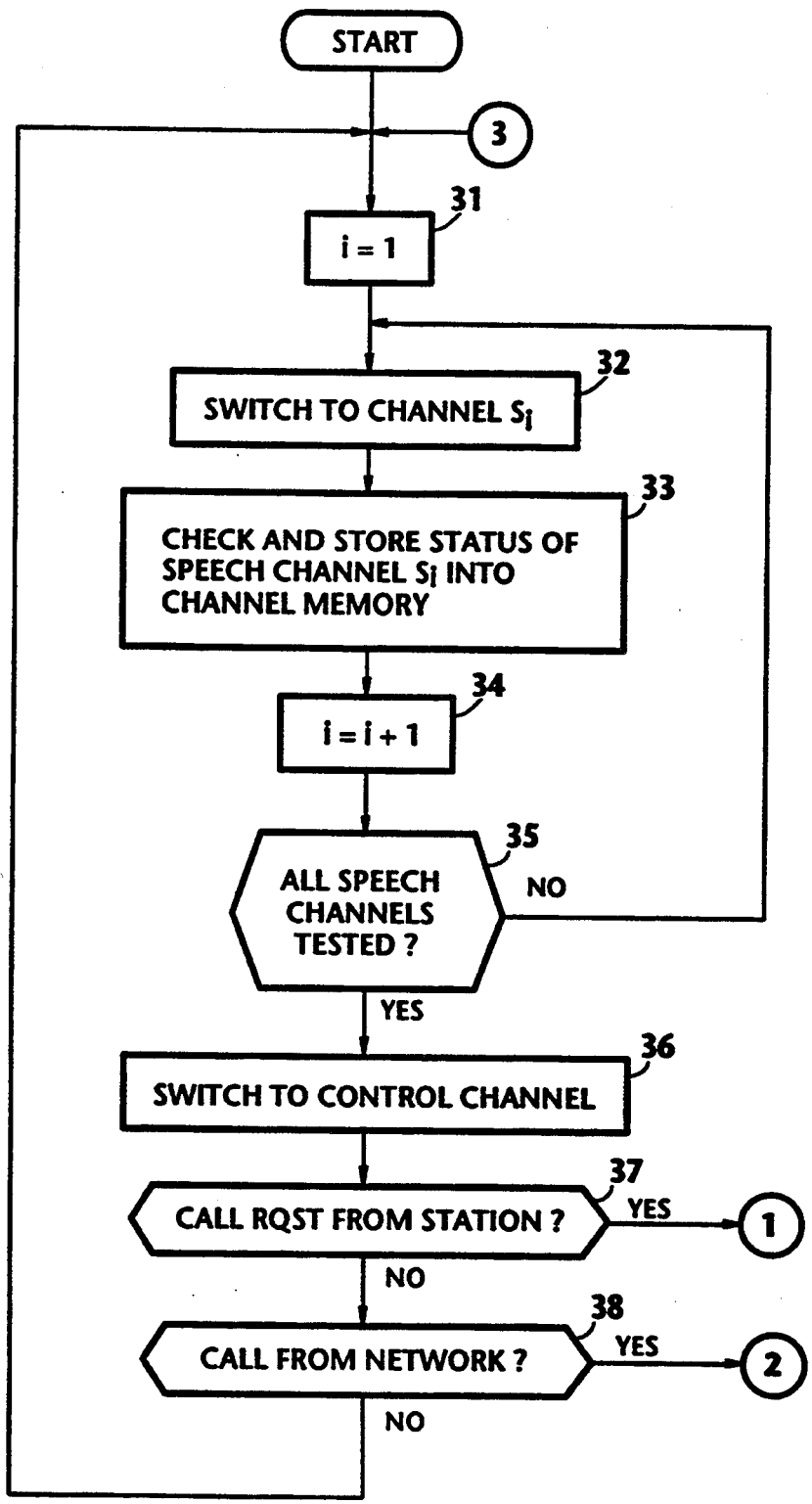

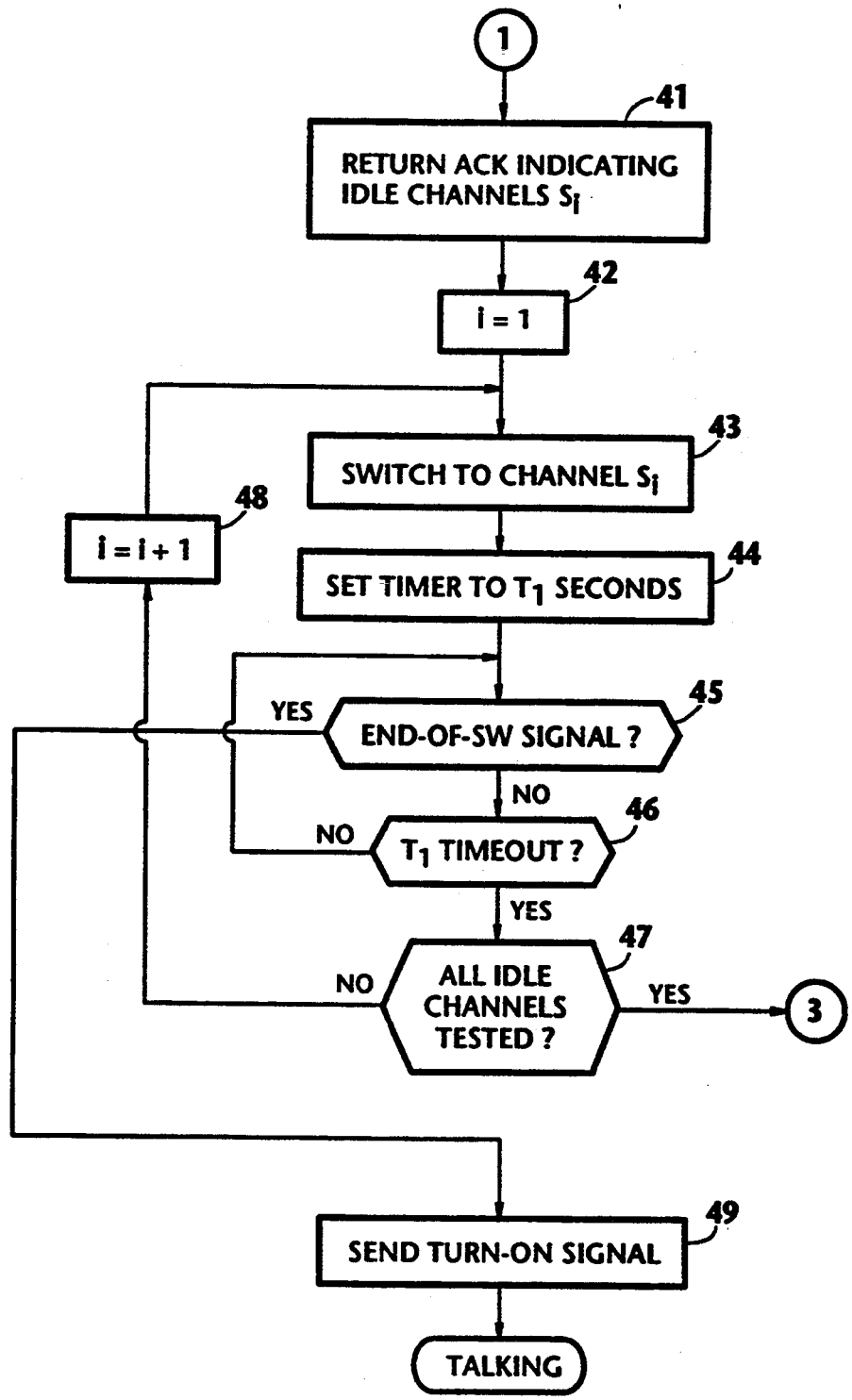

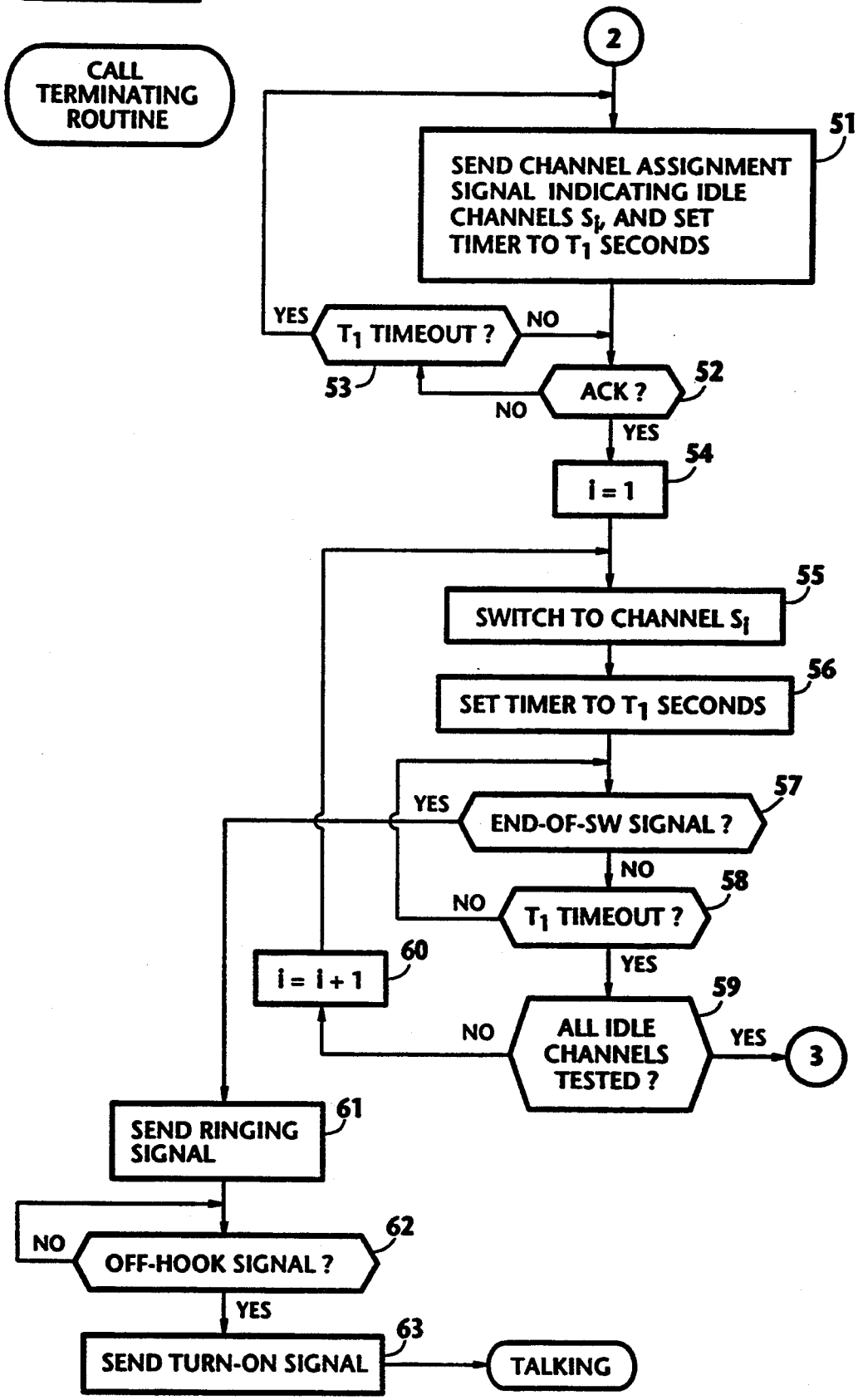

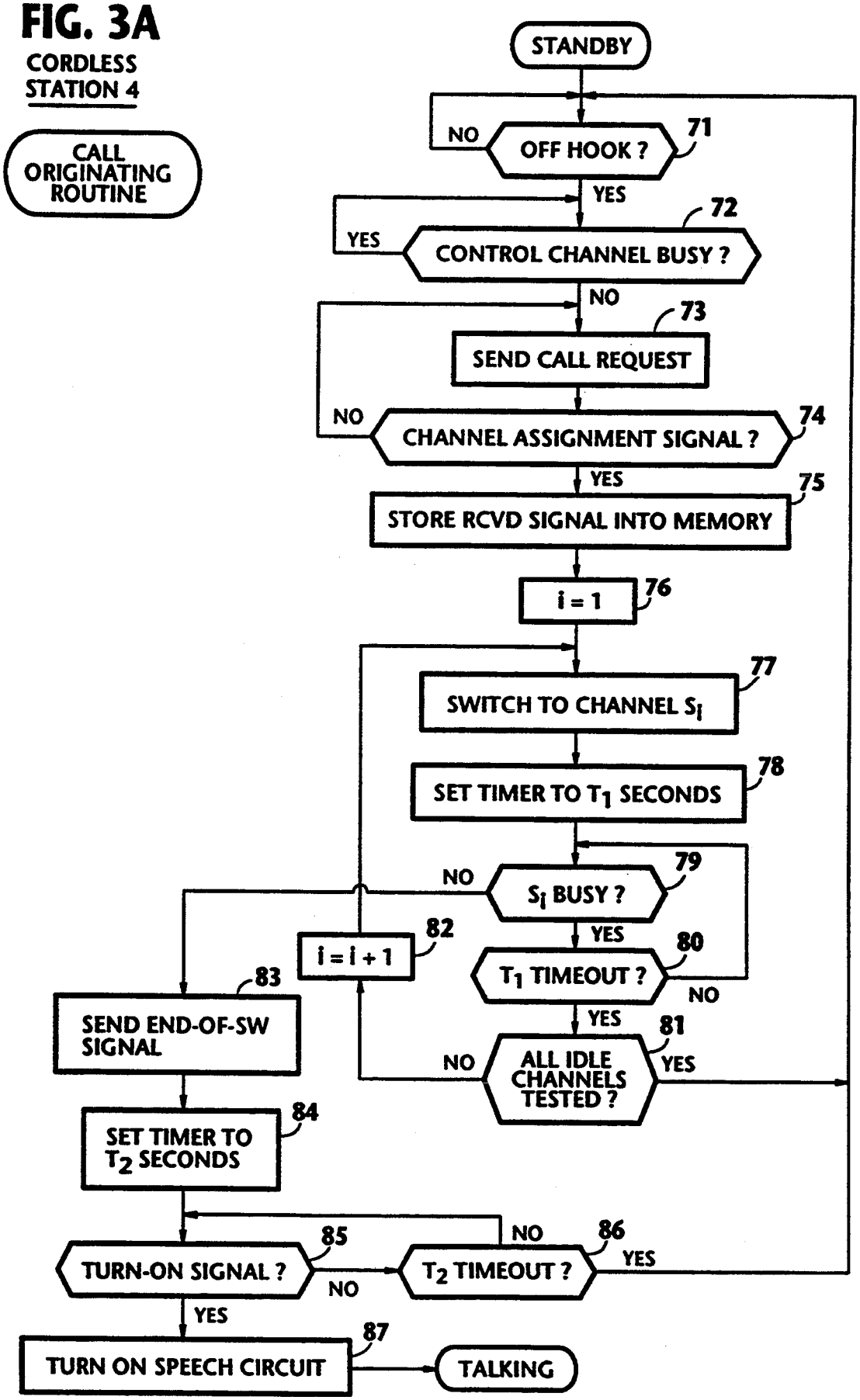

CORDLESS STATION 4

CALL ORIGINATION

CALL TERMINATION

CORDLESS TELEPHONE SYSTEM CAPABLE OF QUICKLY ESTABLISHING CONNECTION DURING CALL SETUP PHASE

BACKGROUND OF THE INVENTION

The present invention relates to a cordless telephone system.

Cordless telephone systems have currently been in widespread use due to their excellent mobility. The system includes a base station interfacing the public or private switched telephone network and a cordless station for exchanging radio control signals with the base station to establish a connection. During a standby mode, the base station constantly scans several speech channels to detect idle channels. In response to a call request from the cordless station, the base station specifies one of the idle speech channels as a possible candidate and informs the cordless station of the identifier of the specified channel over the control channel and waits for a response from the cordless station until a prescribed period expires. On receiving this information through the control channel, the cordless station switches to the specified channel and checks for the availability of the specified channel. Because of different field intensities between the sites of the base station and cordless station, the latter may determine that the specified channel is not actually available. Under such circumstances, the cordless station switches to the control channel and repeats the transmission of a call request to the base station. Failing to receive a response from the cordless station before the prescribed period expires, the base station recognizes that the specified channel is not available and switches to the control channel to wait for the retransmission of a call request. In response to the retransmission, the base station specifies another idle channel and informs this channel identifier to the cordless station to allow it to perform a channel check on the newly specified channel. The process will be repeated until an available speech channel is detected. Similar situations occur when an incoming call is received from the network.

Therefore, the time taken to establish a connection is substantial if busy conditions are repeatedly encountered at the site of the cordless station.

SUMMARY OF THE INVENTION

It is therefore an object of the present invention to provide a cordless telephone system capable of establishing a connection in a short period of time following the reception of an incoming call from the network or an originating call from the cordless station.

According to the present invention, several speech channels are periodically scanned by a base station during a standby mode to detect idle channels from the scanned channels. In response to receipt of a call request from a cordless station or an incoming call from a switched telephone network, the base station transmits a channel identification signal to the cordless station over a control channel identifying the detected idle channels channels as possible candidate channels and switches to a first candidate channel and waits for receipt of an end-of-switching signal from the cordless station within a prescribed period of time. On receiving the channel identificaton signal, the cordless station switches to the first candidate channel and tests the first candidate channel for availability and transmits an end-of-switching signal if the first candidate channel is determined as being idle. The base station switches to a second one of the candidate channels if the end-of-switching signal is not received from the cordless station within the prescribed period of time. Following the selection of the first candidate channel. The cordless station switches to the second candidate channel and tests the second candidate channel for availability at the site of the cordless station if the first candidate channel is determined as being busy within the prescribed period of time. The cordless station transmits the end-of-switching signal over the second candidate channel if it is determined as being idle.

BRIEF DESCRIPTION OF THE DRAWINGS

The present invention will be described in further detail with reference to the accompanying drawings, in which:

FIG. 1 is a block diagram of a cordless telephone system of the present invention;

FIGS. 2A, 2B and 2C are flowcharts describing programmed instructions which are performed by the base station;

FIGS. 3A and 3B are are flowcharts describing programmed instructions which are performed by the cordless station.

DETAILED DESCRIPTION

Figure 3B:
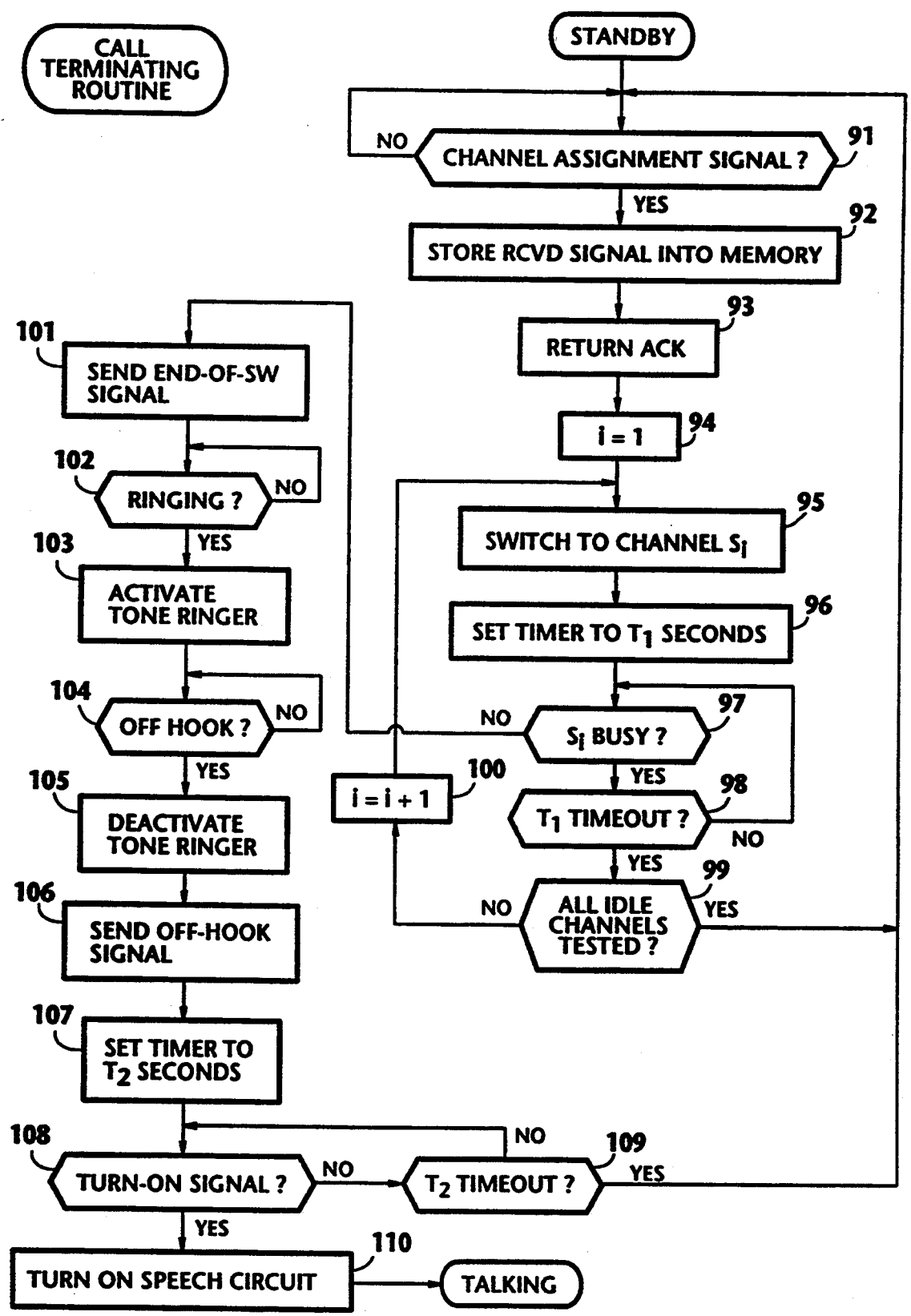

In FIG. 1, two cordless telephone systems are illustrated as adjacent systems which share the same frequency spectrum. Each cordless telephone system comprises a base station 2 connected to a public or private switched telephone network 1 through a subscriber loop 3, and a cordless station 4. Base station 21 includes a hybrid 10 having a two-wire circuit coupled through subscriber loop 31 to the network 1, the transmit portion of the four-wire circuit being coupled to the input of a radio transmitter 11 and the receive portion of the four-wire circuit being coupled to the output of a radio receiver 13. Transmitter 11 and receiver 13 are provided with a respective frequency synthesizer which is controlled by a control circuit 12. The output of transmitter 11 is connected to a transmit antenna 16 and the input of receiver 13 is connected to a receive antenna 17. A channel status memory 14 is connected to control circuit 12 to store busy/idle status of all speech channels. As will be described, this is done by sweeping the frequency synthesizer of receiver 13 across the allocated spectrum so that all speech channels are scanned at periodic intervals and detecting their field intensities. For this purpose, a carrier detector 15 is connected to receiver 13 to supply the control circuit 12 with a busy or idle status signal indicating that the detected carrier intensity of a switched channel is higher or lower than a prescribed threshold, respectively. The busy/idle conditions of all speech channels are stored into channel status memory 14 and periodically updated during a standby mode. During a call processing mode, the memory 14 is accessed by control circuit 12 to select idle speech channels to generate a channel identification signal indicating that the detected idle channels can be used as possible candidate channels.

In cordless station 41, radio signals from base station 21 are received by a receive antenna 28 and supplied to a radio receiver 20. Radio signals from base station $2_2$ of adjacent system are also received by antenna 28 and fed into receiver 20. The audio-frequency output of receiver 20 is applied to a speech circuit 24 whose output is, in turn, coupled to the input of a radio transmitter 21. Speech circuit 24, which is normally turned off, is activated by control circuit 22 in response to a turn-on signal sent from base station $2_1$. The output of transmitter 21 is coupled to a transmit antenna 29 for transmission of signals to receive antenna 17 of the base station. Receiver 20 and transmitter 21 are provided with a respective frequency synthesizer which is controlled by a control circuit 22. A carrier detector 23 is coupled to receiver 20 to detect the intensity of transmitted carrier to supply control circuit 22 with information on the busy/idle status of a channel to which the station is being switched. A keypad 25 supplies dialing information as well as off-hook signal to control circuit 22. An idle channel memory 27 is connected to control circuit 22 to store idle channel data supplied from base station $2_1$ to enable control circuit 22 to sequentially switch the station from one idle speech channel to the next until it detects an actually available speech channel. Receipt of a ringing signal sent from base station $2_1$ causes control circuit 22 to activate a tone ringer 26 and the off-hook condition of the station or receipt of a turn-on signal for speech circuit causes control circuit 22 to deactivate it.

The system has a single control channel and several speech channels. These control and speech channels are commonly used by adjacent systems, so radio signals from antenna 16 of base station $2_1$ are also received by cordless station $4_2$ as shown at $A_1$ and signals from base station $2_2$ are also received by antenna 28 of station $4_1$ as shown at $A_2$. Likewise, signals from antenna 29 of station $4_1$ are also received by base station $2_2$ as shown at $B_1$ and signals from station $4_2$ are also received by antenna 17 of base station $2_1$ as shown at $B_2$.

FLOWCHARTS

The control circuits 12 and 22 are a microprocessor-based controller which is programmed to perform a sequence of instructions as will be described hereinbelow.

In FIG. 2A, during standby modes, base-station control circuit 12 is shown to perform a standby routine in which it constantly scan all speech channels and examines their busy/idle status and updates the channel status memory 14. The program execution starts with step 31 in which variable i is set equal to 1. Exit then is to step 32 to cause base-station transmitter 11 and receiver 13 to switch to speech channel $S_i$ and proceeds to step 33 to check the carrier intensity of channel $S_i$ detectect by carrier detector 15 against the prescribed threshold to determine if channel $S_i$ is idle or currently used by any cordless telephone system and store the busy/idle status of the channel into channel status memory 14. Exit then is to step 34 to increment variable i by one and moves ahead to decision step 35 to check to see if all speech channels are examined. If the answer is negative, control returns to step 32 to repeat the process on the next speech channel $S_{i+1}$ until all speech channels are tested.

If the answer is affirmative in step 35, control proceeds to step 36 to control the transmitter 11 and receiver 13 so that the base station is switched to the control channel to receive control signals (decision steps 37 and 38). If a call request is made from cordless station $4_1$, the decision in step 37 is affirmative and control exits to step 41 (FIG. 2B), and if there is an incoming call from the network, the decision in step 38 is affirmative and control exits to step 51 (FIG. 2C). If negative decision is made in both steps 37 and 38, control returns to step 31 to repeat the standby routine.

In FIG. 2B, if there is an originating call from cordless station $4_1$, base station 2 returns an acknowledgment (ACK) signal over the control channel by containing in it a list of idle channels $S_i$ stored in memory, 14 (step 41). Exit then is to step 42 to set variable i to 1 and switch the base station to an idle speech channel $S_i$ (step 43). A timeout period of $T_1$ seconds is then set in a timer (step 44), and the receipt of an end-of-switching signal from the cordless station is checked (step 45). If the end-of-switching signal is not received, control proceeds to step 46 to check to see if timeout period $T_1$ has expired. If the answer is negative in step 46, control repeats steps 45 and 46 until timeout period $T_1$ expires. if an end-of-switching signal is received within the timeout period $T_1$, control advances to step 49 to send a turn-on signal to the cordless station and enters a talking mode. Otherwise, it exits to step 47 to check to see if all channels contained in the idle channel list are tested. If the answer is negative, variable i is incremented by 1 (step 48) and control returns to step 43 to repeat the process so that the next idle speech channel $S_{i+1}$ is examined. If no end-of-switching signal is received on each of the successively switched idle speech channels, the decision is affirmative in step 47 and control abandons the attempt to establish a connection and returns to the standby routine. In FIG. 2C, if there is an incoming call from the network, base station 2 sends a channel assignment signal indicating a list of idle channels $S_i$ stored in memory 14 and the timer is set to period $T_1$ (step 51). Exit is to step 52 to check for receipt of an ACK signal from the cordless station. If the answer is negative in step 52, step 53 is executed to check for the expiration of period $T_1$. If no ACK signal is returned within the period $T_1$, control returns to step 51 to retransmit the channel assignment signal. If an ACK signal is received, control moves ahead to step 54 to set variable i to 1 and goes to a looped sequence of steps 55 through 60 which are respectively identical to steps 43 through 48 of FIG. 2B.

If an end-of-switching signal is received so the answer is affirmative in step 57, control proceeds to step 61 to transmit a ringing signal over the switched speech channel to receive an off-hook signal (step 62) and transmit a turn-on signal (step 63) to enter a talking mode.

In FIG. 3A, during standby modes, the cordless station is switched to the control channel. A call originating routine begins with step 71 which checks to see if an off-hook condition has occurred. If the answer is affirmative, control exits to step 72 to switch the station to the control channel and checks the output of carrier detector 23 against the prescribed threshold to determine if the control channel is in use by another cordless telephone. If the answer is negative, control proceeds to step 73 to send a call request signal to base station 2. Exit then is to step 74 to check for the presence of a channel assignment signal. If there is none, control returns to step 73 to retransmit the call request signal, and if there is one, control proceeds to step 75 to store into idle channel memory 27 the list of idle speech channels contained in the transmitted channel assignment signal. Variable i is then set equal to 1 (step 76). The cordless station is then switched to an idle speech channel $S_i$ (step 77) and a timer is set to a timeout period $T_1$ (step 78). Exit is to step 79 to check the output of carrier detector 23 against the threshold to determine if that channel is busy. If it is, control exits to step 80 to check for the expiration of the timeout period and goes to step 81 to check to see if all channels of the idle list are tested. If the answer is negative, variable i is incremented by 1 (step 82) and control returns to step 77 to repeat the process on the next idle speech channel $S_{i+1}$. If the answer is affirmative in step 81, control returns to the starting point of the call originating routine.

If the switched idle channel is not busy, exit then is to step 83 to send an end-of-switching signal, followed by the setting of the timer to a timeout period $T_2$ seconds in step 84. Exit then is to step 85 to check for the presence of a turn-on signal. If there is one, control proceeds to step 87 to turn on the speech circuit 24 to enter a talking mode. If the turn-on signal is not received, a timeout check is made (step 86) to repeat step 85 until period $T_2$ expires, whereupon control returns to step 71.

In FIG. 3B, the cordless station starts a call terminating routine with step 91 which checks for the presence of a channel assignment signal. If there is one, control proceeds to step 92 to store the list of idle speech channels contained in the received signal into memory 27 and goes to step 93 to return an ACK signal. Steps 94 through 100 are executed in a manner identical to steps 76 through 82 of FIG. 3A, so that idle channels will be successively tested if each test encounters a busy channel.

If an idle speech channel is available, control exits from step 97 to step 101 to send an end-of-switching signal, causing the base station to send a ringing signal (step 61, FIG. 2C). If the ringing signal is received by the cordless station (step 102), the tone ringer 26 is activated (step 103) to urge the user to go off hook. If an off-hook condition is detected (step 104), control proceeds to step 105 to deactivate the tone ringer and goes to step 106 to send an off-hook signal, causing the base station to send a turn-on signal (step 63). The timer is set to period $T_2$ (step 107) to wait for the reception of the turn-on signal (step 108) until period $T_2$ expires (step 109). If the answer is affirmative in step 108, control exits to step 110 to turn on the speech circuit 24.

OPERATION

The operation of the system will be described with reference to FIGS. 4A and 4B together with the flowcharts described above. Assume that, in a simplified example, speech channels $S_1$ and $S_2$ are detected as being idle by the base station during a standby mode.

Figure 4A:
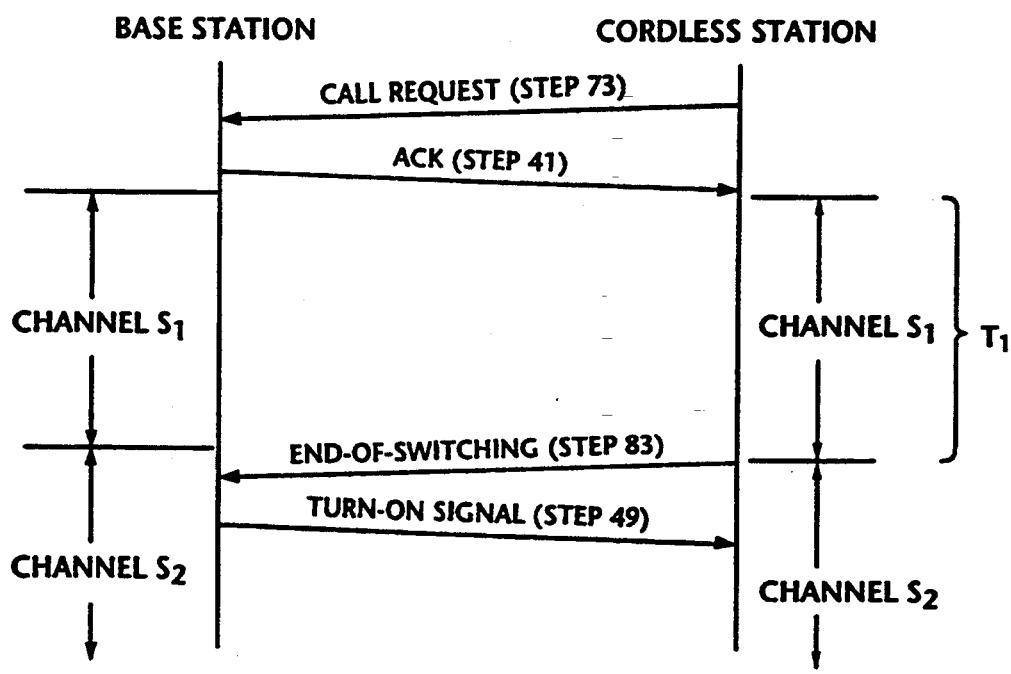
FIGS. 4A and 4B are illustrations of control signals exchanged between the base station and cordless station during a call originating mode and a call terminating mode, respectively.

In FIG. 4A, if a call is originated from cordless station $4_1$, a call request signal is sent (step 73, FIG. 3A) to base station $2_1$. On receiving it (step 37, FIG. 2A), base station $2_1$ returns an ACK signal containing a list of idle speech channels $S_1$ and $S_2$ (step 41, FIG. 2B). Data indicating the idle speech channels $S_1$ and $S_2$ are stored into idle channel memory 27 (step 75) and the cordless station is switched from the control channel to speech channel $S_1$ (steps 76, 77) and the busy/idle status of channel $S_1$ is checked during timeout period $T_1$ (steps 78, 79, 80). If channel $S_1$ is used by cordless station $4_2$, the signal from base unit $2_2$ will be received by antenna 29 and carrier detector 23 produces an output. Therefore, the answer in step 79 is negative. After period $T_1$ expires, control exits from step 80 to step 81, and repeats the process so that cordless station $2_1$ is then switched to speech channel $S_2$.

Following transmission of the ACK signal, base station $2_1$ is switched to idle channel $S_1$ (steps 42, 43, FIG. 2B) expecting the receipt of an end-of-switching on that channel from cordless station 41. Since this signal is not received within tile timeout period $T_1$ (step 46), base station $2_1$ switches to channel $S_2$. If this channel is detected by cordless station $4_1$ as being idle, an end-of-switching signal is sent on channel $S_2$ (step 83, FIG. 3A). In response to this signal (step 45), base station 21 transmits a turn-on signal (step 49), which is received by the cordless station (step 85) to rum on the speech circuit 24.

Figure 4B:
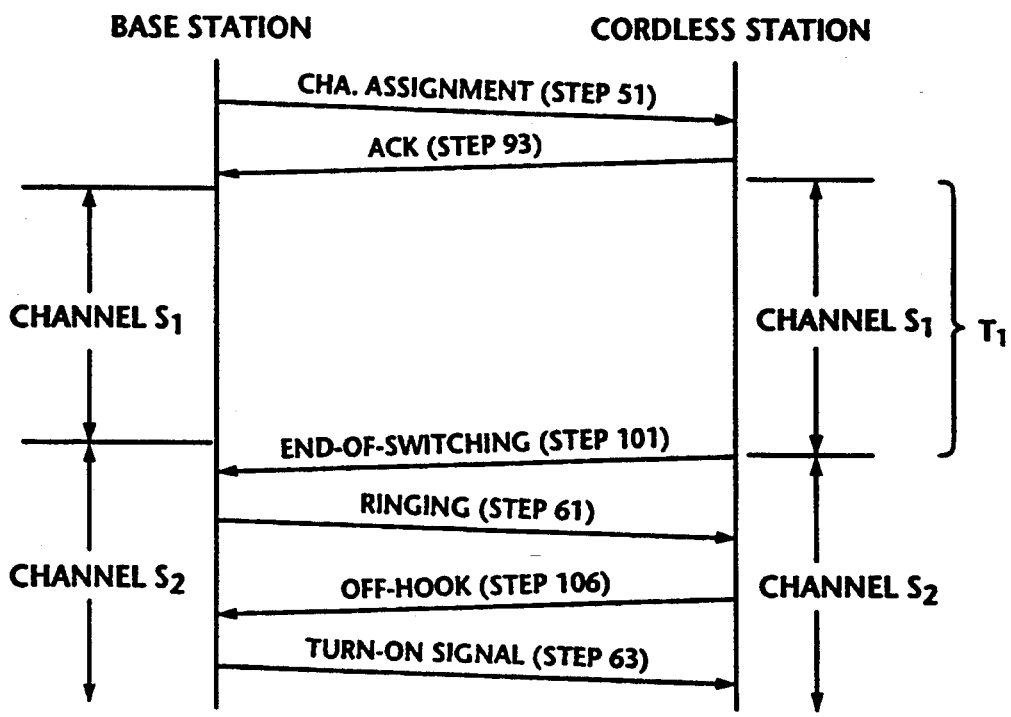

In FIG. 4B, if an incoming call is received from the network (step 38, FIG. 2A), base-station controller 12 sends a channel assignment signal (step 51, FIG. 2C) containing in it the list of idle channels $S_1$ and $S_2$. Cordless station $4_1$ responds to this signal by returning an ACK signal (step 92, FIG. 3B) and switching it to channel S1 to check for its busy/idle status. If this channel is detected by cordless station 41 as being busy, period $T_1$ lapses and the cordless station switches to channel $S_2$ and transmits an end-of-switching signal on channel $S_2$ (step 101).

Base station 21 responds to the ACK signal from cordless station $4_1$ by switching to channel $S_1$ (steps 54, 55). Since this channel is found busy on the cordless station side of the system, period $T_1$ expires also in the base station (steps 58, 59) and it switches to channel $S_2$ (steps 60, 55) to receive the end-of-switching signal (step 57). A ringing signal is then sent to the cordless station (step 61).

When cordless station $4_1$ activates its tone ringer (steps 102, 103) in response to the ringing signal, goes off hook (step 104) and deactivates the tone ringer (step 105). An off-hook signal is then sent (step 106), which is received by the base station (step 62) and a turn-on signal is sent to the cordless station (step 63) to allow it turn on its speech circuit.

It is seen that, while the cordless station is switched successively to an idle channel if each channel test reveals a busy condition, the base station is switched successively to the same channel in response to the end-of-switching signal from the cordless station signaling that the switched speech channel is also idle on the cordless station side of the system.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A cordless telephone system having a control channel and a plurality of speech channels, comprising:
a base station coupled to a switched telephone network, and a cordless station, said base station including means for scanning said speech channels during a standby mode and detecting idle channels from the scanned channels, means responsive to a call request from the cordless station or an incoming call from the network for transmitting a channel identification signal to the cordless station over said control channel identifying the detected idle channels as possible candidate channels, and means for selecting a first one of the candidate channels and waiting for receipt of an end-of-switching signal from the cordless station, and for selecting a second one of the candidate channels if the end-of-switching signal is not received within a prescribed period of time following the selection of the first candidate channel; and said cordless station including means for receiving said channel identification signal over said control channel, and means for selecting and testing said first candidate channel identified by the received channel identification signal for availability at the site of the cordless station and transmitting said end-of-switching signal over the selected first candidate channel if same is determined as being idle, and for selecting first candidate channel if same is determined as being idle, and for selecting and testing said second candidate channel for availability at said site if the selected first candidate channel is determined as being busy and for transmitting said end-of-switching signal over the selected second candidate channel if same is determined as being idle.

2. A cordless telephone system as claimed in claim 1, wherein said base station comprises means for waiting for receipt of the end-of-switching signal during a second prescribed period of time after the base station is switched to the second candidate channel and selecting a third one of the idle channels if said end-of-switching signal is not received during said second prescribed period of time, and wherein said cordless station comprises means for selecting and testing said third candidate channel if the selected second candidate channel is determined as being busy during said second prescribed period of time and for transmitting said end-of-switching signal over the selected third channel if same is determined as being idle.

3. A cordless telephone system as claimed in claim 1, wherein said base station comprises memory means for storing busy/idle status of said scanned channels and means for periodically updating the busy/idle status of said scanned channels with results of the scanning means during said standby mode.

4. A cordless telephone system as claimed in claim 1, wherein said cordless station comprises memory means (27) for storing data identifying the possible candidate channels contained in the received channel identification signal and selecting one of the candidate channels according to the data stored in said memory means.

5. A cordless telephone system as claimed in claim 1, wherein said base station comprises means for transmitting a proceed-to-talk signal to said cordless station in response to receipt of said end-of-switching signal when said call request is originated from said cordless station and wherein said cordless station comprises means for establishing a talking connection in response to said proceed-to-talk signal.

6. A cordless telephone system as claimed in claim 1, wherein said base station comprises means (61) for transmitting a ringing signal to said cordless station in response to receipt of said end-of-switching signal when said incoming call is received from the network and means for transmitting a proceed-to-talk signal to said cordless station in response to receipt of an off-hook signal from the cordless station, and wherein said cordless station comprises a tone ringer for alerting users in response to receipt of said ringing signal, means for transmitting said off-hook signal when an off-hook condition is detected in said cordless station and, means for establishing a talking connection in response to said proceed-to-talk signal.

7. In a cordless telephone system having a control channel and a plurality of speech channels, a method comprising the steps of:
  a) scanning said speech channels during a standby mode and detecting idle channels from the scanned channels;
  b) receiving, at a base station, a call request from a cordless station at a base station or an incoming call from a switched telephone network;
  c) transmitting a channel identification signal from said base station to the cordless station over said control channel identifying the detected idle channels as possible candidate channels, and receiving said channel identification signal over said control channel at said cordless station;
  d) switching the base station to a first one of the candidate channels and waiting for receipt of an end-of-switching signal from said cordless station and switching the cordless station to said first candidate channel and testing said first candidate channel for availability at the site of the cordless station and transmitting an end-of-switching signal if said first candidate channel is determined as being idle; and
  e) switching the base station to a second one of the candidate channels if the end-of-switching signal is not received from the cordless station within a prescribed period of time following the selection of the first candidate channel and switching the cordless station to the second candidate channel and testing said second candidate channel for availability at the site of the cordless station if the first candidate channel is determined as being busy and transmitting said end-of-switching signal over the second candidate channel if same is determined as being idle.

8. A method as claimed in claim 7, further comprising the steps of:
  A) waiting for receipt of the end-of-switching signal during a second prescribed period of time after the base station is switched to the second candidate channel;
  B) switching the base station to a third one of the idle channels if said end-of-switching signal is not received during said second prescribed period of time, switching said cordless station to the third candidate channel if the second candidate channel is determined as being busy during said second prescribed period of time and testing the third candidate channel for availability at the site of said cordless station; and
  C) transmitting said end-of-switching signal from the cordless station over the selected third channel if same is determined as being idle.

* * * * *

UNITED STATES PATENT AND TRADEMARK OFFICE
CERTIFICATE OF CORRECTION

PATENT NO. : 5,384,827
DATED : January 24, 1995
INVENTOR(S) : Hiromi Orikasa

It is certified that error appears in the above-indentified patent and that said Letters Patent is hereby corrected as shown below:

Col. 2, line 37 delete "21" insert --$2_1$--

Col. 2, line 39 delete "31" insert --$3_1$--

Col. 2, line 67 delete "41" and insert --$4_1$--

Col. 3, line 52 delete "detectect" insert --detected--

Col. 6, line 4 delete "41" insert --$4_1$--

Col. 6, line 5 delete "tile" insert --the--

Col. 6, line 9 delete "21" insert --$2_1$--

Col. 6, line 20 delete "41" insert --$4_1$-- col. 6, line 24 delete "21" insert --$2_1$--

Signed and Sealed this

First Day of August, 1995

*Attest:*

BRUCE LEHMAN

*Attesting Officer*     *Commissioner of Patents and Trademarks*